(12) United States Patent
Bour et al.

(10) Patent No.: US 12,449,246 B2
(45) Date of Patent: Oct. 21, 2025

(54) DEVICE AND METHOD FOR MONITORING A DISK BRAKE SYSTEM OF AN AIRCRAFT LANDING GEAR

(71) Applicant: SAFRAN LANDING SYSTEMS, Velizy-Villacoublay (FR)

(72) Inventors: Nadia Bour, Moissy-Cramayel (FR); Alexandre Biava, Moissy-Cramayel (FR); Didier Da Costa, Moissy-Cramayel (FR)

(73) Assignee: SAFRAN LANDING SYSTEMS, Velizy-Villacoublay (FR)

( * ) Notice: Subject to any disclaimer, the term of this patent is extended or adjusted under 35 U.S.C. 154(b) by 311 days.

(21) Appl. No.: 18/275,328

(22) PCT Filed: Feb. 24, 2022

(86) PCT No.: PCT/EP2022/054588
§ 371 (c)(1),
(2) Date: Aug. 1, 2023

(87) PCT Pub. No.: WO2022/189152
PCT Pub. Date: Sep. 15, 2022

(65) Prior Publication Data
US 2024/0302153 A1 Sep. 12, 2024

(30) Foreign Application Priority Data
Mar. 9, 2021 (FR) .................................... 2102257

(51) Int. Cl.
 *G01B 5/02* (2006.01)
 *B64C 25/42* (2006.01)
(52) U.S. Cl.
 CPC .............. *G01B 5/025* (2013.01); *B64C 25/42* (2013.01)

(58) Field of Classification Search
CPC ......... G01B 5/025; B64C 25/42; F16D 55/36; F16D 66/02
See application file for complete search history.

(56) References Cited

U.S. PATENT DOCUMENTS

| 1,339,896 | A | * | 5/1920 | Kemper | .................. | G01B 3/48 63/11 |
| 1,857,523 | A | * | 5/1932 | Wittel | .................. | G03B 21/323 33/561.2 |

(Continued)

FOREIGN PATENT DOCUMENTS

| AU | 6900574 A | 11/1975 |
| EP | 3480485 A1 | 5/2019 |

(Continued)

OTHER PUBLICATIONS

Search Report from the French Intellectual Property Office on corresponding FR application (FR 2102257) dated Nov. 17, 2021.

(Continued)

*Primary Examiner* — Yaritza Guadalupe-McCall
(74) *Attorney, Agent, or Firm* — Alumen IP Law PC

(57) ABSTRACT

An assembly of a disk brake system (2) of an aircraft landing gear (I) and a monitoring device (3), the disk brake system (2) comprising at least one stator disk (21) and at least one rotor disk (22) configured to be pressed against said stator disk (21), the monitoring device (3) comprising a tape (30), the tape (30) comprising at least one visual information item associated with a predetermined circumferential range of the stator disk (21), the tape (30) being positioned in contact with the circumference of the stator disk (21), a first gripping member (31) attached to a first end of the tape (30) and a second gripping member (32) attached to a second end of the tape (30) so as to make it possible to stretch the tape around (Continued)

the circumference of the stator disk (21) in order to accurately determine the circumference of the stator disk (21).

10 Claims, 2 Drawing Sheets

(56) References Cited

U.S. PATENT DOCUMENTS

| | | | |
|---|---|---|---|
| 2,262,664 A | 11/1941 | Bresson | |
| 4,441,258 A * | 4/1984 | McDaniel | G01B 5/025 33/759 |
| 8,807,290 B2 | 8/2014 | Kubicki et al. | |
| 2024/0302153 A1 * | 9/2024 | Bour | B64C 25/42 |

FOREIGN PATENT DOCUMENTS

| | | |
|---|---|---|
| FR | 3070191 A1 | 2/2019 |
| GB | 2106250 A | 4/1983 |
| WO | 2019/210971 A1 | 11/2019 |

OTHER PUBLICATIONS

International Search Report and Written Opinion on corresponding PCT application (PCT /EP2022/054588) from International Searching Authority (EPO) dated Apr. 7, 2022.

* cited by examiner

[Fig. 2]

DEVICE AND METHOD FOR MONITORING A DISK BRAKE SYSTEM OF AN AIRCRAFT LANDING GEAR

TECHNICAL FIELD

The present invention relates to the field of monitoring an aircraft landing gear, in particular a disk brake system of a landing gear.

In a known manner, an aircraft landing gear comprises a main leg on which at least one wheel is rotatably mounted in order to taxi the aircraft on the ground when it lands. In order to allow the aircraft to slow down after landing, the landing gear comprises a disk brake system which comprises at least one stator disk, which is fixed in relation to the main leg, at least one rotor disk, which is integral in rotation with the wheel and at least one actuator configured to press the stator disk against the rotor disk in order to convert the kinetic energy of the wheel into thermal energy which is dispersed in the disks. The disk brake system comprises an alternation of stator disks and rotor disks and is known by those skilled in the art as a "heat sink". The disks are usually made of a composite material comprising carbon. Such disks are for example known by patent application FR3070191A1.

A very high level of thermal energy is dissipated by the disk brake system at each landing. In practice, an oxidation reaction occurs between the carbon disks and the oxygen in the air. Taking place in the presence of oxygen, this oxidation reaction is all the more substantial the higher the temperature level reached by the disk. Thermal oxidation leads to the transformation of carbonaceous material into gas. This damage degrades the mechanical characteristics of the disks and may even lead to their breakage. To limit this degradation, the disks are covered with anti-oxidation protection but the oxidation reaction cannot be completely avoided.

Monitoring the oxidation condition of a disk brake system is complex because the wheel of the landing gear has to be removed. In practice, oxidation monitoring is performed visually at each wheel change of the landing gear. The lack of visibility makes this visual check ineffective. In case of breakage of disks, the aircraft is immobilized, which represents a disadvantage for the operator.

The objective of the present invention is to propose a device for monitoring the level of thermal oxidation of a disk brake system of an aircraft landing gear that may be used during scheduled maintenance or when removing the wheel from the landing gear, by non-specialized operators and under various conditions (rain, snow, night, etc.). A second objective is to propose a monitoring device that is robust and simple in design. Finally, a third objective is to propose a monitoring device that may be used when the disk brake system is still hot following a landing.

SUMMARY

The invention relates to a device for monitoring a disk brake system of an aircraft landing gear, the disk brake system comprising at least one stator disk and at least one rotor disk configured to be pressed against said stator disk, the monitoring device comprising:

a tape that extends longitudinally and is configured to be positioned in contact with the circumference of the stator disk, the tape comprising at least one visual information item associated with a predetermined circumferential range of the stator disk, a first gripping member attached to a first end of the tape, and a second gripping member attached to a second end of the tape to allow the tape to make it possible to tension the tape around the circumference of the stator disk in order to accurately determine the circumference of the stator disk.

Thanks to the device according to the invention, the measurement of the circumference of a stator disk may be carried out in a convenient and fast manner by an operator. In addition, the presence of a visual information item allows the operator to monitor the perimeter to determine whether oxidation exists and its degree. This allows the damage to be monitored without removing the disk brake system.

Preferably, the tape is made of a material with a coefficient of thermal expansion below $15*10^{-6}K^{-1}$. This allows an accurate measurement even when the disk brake system is still hot.

Preferably, the tape has a width of less than 10 mm, which allows the tape to be positioned between two rotor disks to conform to the shape of the stator disk. In other words, such a tape is especially suitable for aeronautical use.

According to a preferred aspect, the tape has a length between 1,300 mm and 2,500 mm to suit the average circumference of a stator disk of a disk brake system.

Preferably, at least one visual formation item is in the form of a longitudinal portion of the tape that comprises a color and/or relief. Thus, visual information is global and may be determined unambiguously, which is not the case with a conventional graduation that is difficult to read at a distance and under difficult conditions.

Preferably, the tape has at least two visual information items associated respectively with two predetermined circumferential ranges of the statoric disk, preferably consecutive. In this way, it may be determined whether maintenance is necessary after the monitoring step.

According to a preferred aspect of the invention, the tape has at least one slot wherein a portion of the tape is inserted so as to form a loop configured to be positioned in contact with the circumference of the stator disk. The presence of a slot advantageously allows the tape to wind onto itself to form a regular loop guaranteeing a circumference measurement that is accurate.

Preferably, the tape has at least one reading mark configured to determine the visual information to be taken into account. This guides the reading for the operator.

Preferably, the tape is metallic to have high robustness.

The invention also relates to an assembly of a disk brake system of an aircraft landing gear and a monitoring device as presented previously, the disk brake system comprising at least one stator disk and at least one rotor disk configured to be pressed against said stator disk, the tape being positioned in contact with the circumference of the stator disk.

Preferably, the stator disk is mounted between two rotor disks, even more preferably, the thickness of the stator disk being less than 10 mm. Preferably, at least one disk comprises carbon.

The invention also relates to a method for monitoring a disk brake system of an aircraft landing gear with a monitoring device as presented previously, the disk brake system comprising at least one stator disk and at least one rotor disk configured to be pressed against said stator disk, the monitoring method comprising:

A step of positioning the tape in contact with the circumference of the stator disk, A step of traction by an operator on the first gripping member and on the second gripping member so as to tension the tape around the circumference of the stator disk, and A step of reading a visual information item relative to the circumference of the stator disk on the tape in order to deduce the degradation of the stator disk by thermal oxidation.

BRIEF DESCRIPTION OF THE DRAWINGS

The invention will be better understood upon reading the following description, given as an example, and by referring to the following figures, given as non-limiting examples, wherein identical references are given to similar objects.

Note that the figures set out the invention in detail in order to implement the invention, said figures may of course be used to better define the invention where applicable.

DETAILED DESCRIPTION

The invention will be presented for the monitoring of the thermal oxidation of a disk of a disk brake system of an aircraft landing gear.

Figure 1:
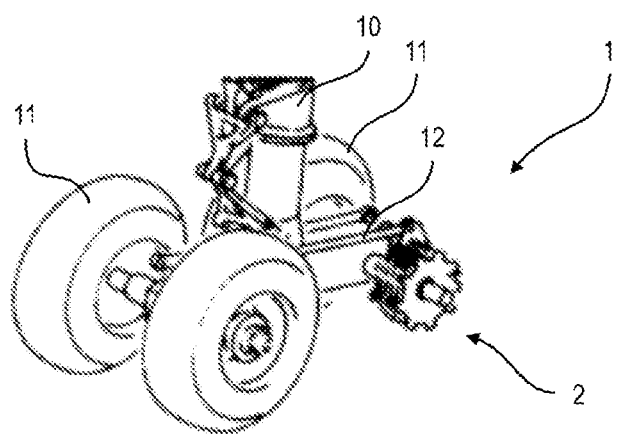
FIG. 1 is a schematic representation of a landing gear comprising a disk brake system.
Figure 5:
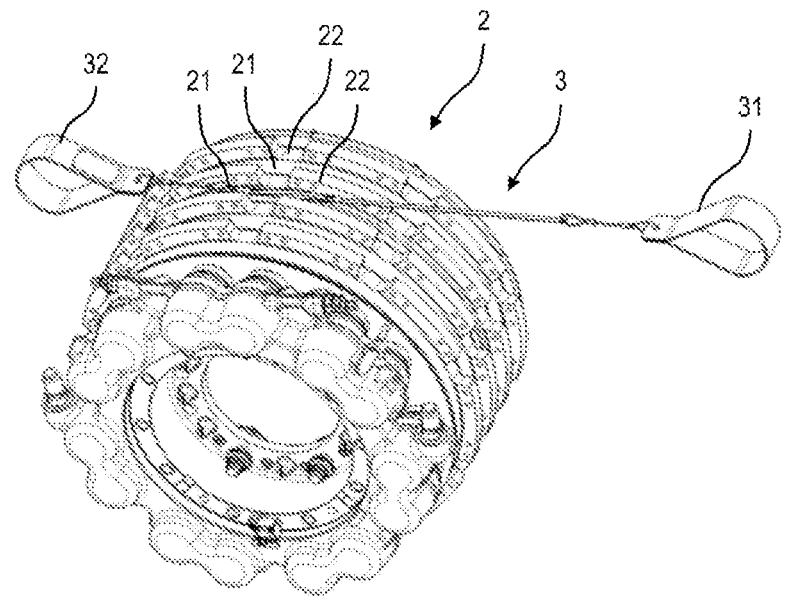
FIG. 5 is a schematic representation of the use of the monitoring device on a disk brake system.

In reference to FIG. 1, a landing gear 1 is shown comprising a main leg 10 on which at least one wheel 11, fitted with a tire, is mounted mobile in rotation in order to taxi the aircraft on the ground when it lands. In order to allow the aircraft to slow down after landing, the landing gear 1 comprises a disk brake system 2 comprising at least one stator disk, which is fixed in relation to the main leg 10, at least one rotor disk, which is integral in rotation with the wheel 11 and at least one actuator 12 configured to press the stator disk against the rotor disk in order to convert by friction the kinetic energy of the wheel 11 into thermal energy which is dispersed in the disks. As shown in FIG. 5, the disk brake system 2 comprises an alternation of stator disks 21 and rotor disks 22. Such a disk brake system 2 is known by those skilled in the art as a "heat sink". The stator disks 21 and rotor disks 22 are made of a composite material comprising carbon.

As previously presented, an oxidation reaction occurs between the carbon disks 21, 22 and the oxygen in the air. This oxidation reaction may degrade the characteristics of the disks 21, 22 and lead to the breakage thereof. During a monitoring of a disk brake system 2, it was noticed that the disks 21, 22 located in the center are the hottest and are most likely to be damaged by thermal oxidation. In practice, a reduction in the internal perimeter of the central rotor disks 22 and a reduction in the external perimeter of the central stator disks 21 were observed.

In order to allow inspection without removing the disk brake system 2, the invention relates to a monitoring device configured to measure the external perimeter of the stator disks 21, in particular those arranged at the center of the disk brake system 2. Unlike the inner diameter which is difficult to access without removing the wheel, the external perimeter of the stator disks 21 may be measured reliably while keeping the disk brake system 2 assembled on the aircraft. Advantageously, the measurement of the outer perimeter of the stator disk may be used to determine the level of thermal oxidation.

In the prior art, devices for measuring the circumference of an object are already known. A measuring device is known in the form of a simple tape which is very rigid and cannot precisely conform to the circumference of a cylindrical object, in particular that of a statoric disk. In addition, such a measuring device requires the user to touch the object being measured, which is not possible for a stator disk which may be at a high temperature. In addition, such a measuring device expands and is damaged when it comes into contact with an object at high temperature, which adversely affects the measurement accuracy and its service life.

In addition, the width of a commercially available measuring device is substantial and it cannot be positioned around the circumference of a stator disk arranged between two larger diameter rotor disks, in particular in the event of substantial degradation. Finally, such a measuring device is usually graduated in centimeters and millimeters, making it difficult for an operator to take a measurement under difficult conditions (night, rain, snow, etc.).

Figure 2:
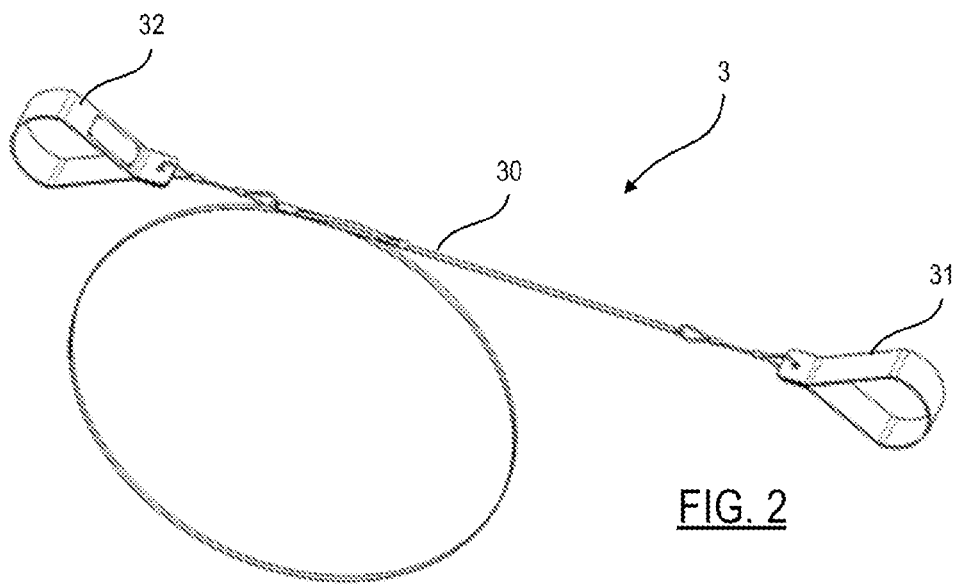
FIG. 2 is a schematic representation of a device for monitoring the disk brake system of a landing gear according to one embodiment of the invention.

According to the invention, in reference to FIG. 2, the monitoring device 3 comprises:

a tape 30 that extends longitudinally and is configured to be positioned in contact with the circumference of a stator disk 21, the tape 30 comprising at least one visual information item 41, 42, 43 (not shown in FIG. 2) associated with a predetermined circumferential range of the stator disk 21, A first gripping member 31 attached to a first end of the tape 30 and a second gripping member 32 attached to a second end of the tape 30 so as to make it possible to tension the tape 30 around the circumference of the stator disk 21 in order to precisely determine the circumference of the stator disk 21.

In this example, the tape 30 is metallic in order to be robust and resist corrosion and abrasion. Preferably, the tape 30 is made of stainless steel. It goes without saying that the tape 30 could be made of other materials, in particular, a composite material comprising fibers, for example, carbon or ceramic fibers (glass, basalt, etc.) as well as materials with an organic matrix that may withstand temperatures of around 100° C.

Preferably, the tape 30 has a coefficient of thermal expansion less than $15*10^{-6}K^{-1}$. Such a property is advantageous given that it allows an operator to use the monitoring device 3 when the disk brake system 2 is still hot following a landing. In other words, monitoring may be carried out directly between a landing and a take-off, without immobilizing the aircraft.

Figure 4:
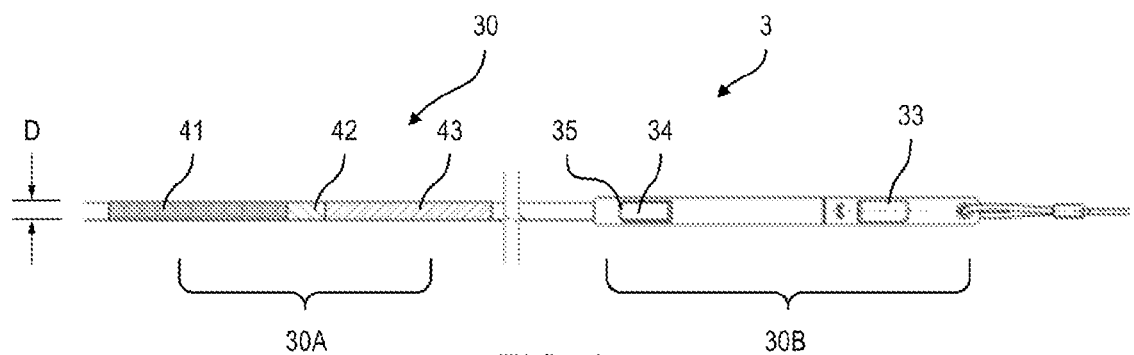
FIG. 4 is a flat schematic representation of longitudinal portions of the tape of the monitoring device of FIG. 2.

In this example, in reference to FIG. 4, the tape 30 has a width D less than 10 mm. Such a width is advantageous given that it allows the tape 30 to be placed around the circumference of a stator disk 21 positioned between two rotor disks 22. In a known manner, a stator disk 21 has a smaller diameter than that of rotor disks 22. Also, such a width D allows the tape to be placed between two rotor disks spaced with a width of 10 mm, in particular, in the event of significant degradation by thermal oxidation of the stator disk 21. A width of less than 10 mm allows the tape 10 to conform to the circumference of a stator disk 21 in a stable manner.

The thickness of the tape 30 allows the tape to bend and conform to the circumference of a stator disk 21. Preferably, the thickness of the tape 30 is less than 0.6 mm in order to avoid ridge effects that an excessively rigid tape could form when trying to bend it to conform to a circumference. Such ridges would distort the measurement. The tape 30 is thick enough to give the tape strength of use.

Preferably, the length of the tape 30 is between 1,300 mm and 2,500 mm in order to measure the circumference of any stator disk 21 of a disk brake system 2.

In this example, as shown in FIG. 4, the tape 30 comprises several visual information items 41, 42, 43 relating to the circumference of the stator disk 21, in order to indicate visually to an operator whether the measured circumference is compliant (low degradation due to thermal oxidation) or reduced (strong/critical degradation due to thermal oxidation). Preferably, the visual information items 41, 42, 43 may represent several degrees of degradation due to thermal oxidation.

In reference to FIG. 4, the tape 30 comprises three visual information items 41, 42, 43 which are in the form of consecutive longitudinal portions which correspond respectively to low degradation (green longitudinal portion), high degradation (yellow longitudinal portion) and critical degradation (red longitudinal portion). Each visual information item 41, 42, 43 is associated with a range of outer circumference values which is predetermined, preferably, by feedback.

In order to resist friction and wear, at least one visual information item 41, 42, 43 comprises a relief made by laser engraving. Preferably, as shown in FIG. 4, all visual information items 41, 42, 43 have different reliefs in order to be able to be differentiated visually. The combined use of a color and a relief for each visual information item 41, 42, 43 makes it easier to read over time. In case of wear and disappearance of the color, each visual information item 41, 42, 43 may be differentiated by its relief. Advantageously, each visual information item 41, 42, 43 may be restored by relying on the different visible reliefs.

According to a preferred aspect of the invention, each monitoring device 3 is specific to a type of landing gear 1 of an aircraft. It is preferably stored in a case to protect it from kinks, impacts, grease or oil. The case may be transported by maintenance operators. Preferably, each monitoring device 3 is identified by an identification plate positioned, in particular, on a gripping member 31, 32.

Figure 3:
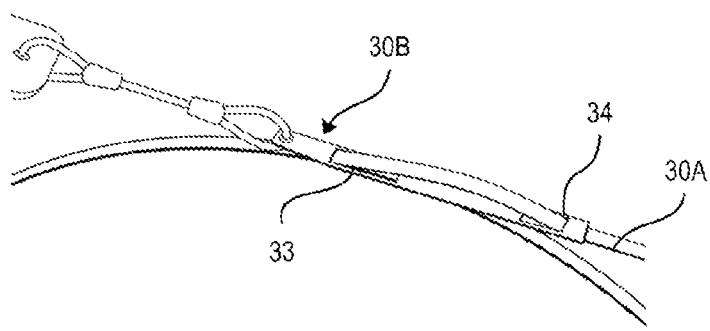
FIG. 3 is a close-up schematic representation of the monitoring device of FIG. 2.

As shown in FIGS. 3 and 4, the tape 30 comprises at least one slot 33, 34 wherein a portion of the tape 30 is inserted so as to form a loop configured to be positioned in contact with the circumference of the stator disk 21. Thus, the tape 30 conforms to the outer surface of the stator disk 21 to accurately measure its outer circumference.

In this embodiment, still in reference to FIGS. 3 and 4, the tape 30 comprises a first part 30A, which comprises the visual information items 41, 42, 43, and a second part 30B which comprises two slots 33, 34 to enable a loop to be formed as shall be presented subsequently. When the loop is formed, in reference to FIG. 3, only a longitudinal portion of the first part 30A of the tape 30 is visible on the second part 30B. The first part 30A of the tape 30 may slide with respect to the second part 30B to adjust the diameter of the loop formed by the tape. Preferably, the first part 30A has a width D less than 6.5 mm to allow the positioning thereof between two rotor disks 22.

Preferably, the second part 30B comprises a reading mark 35 in order to visually define the visual information 41, 42, 43 that must be taken into account, i.e., that which is aligned with the reading mark 35. In this example, the reading mark 35 corresponds to one end of the slot 34 as shown in FIG. 4. It goes without saying that other types of reading marks may be suitable.

Preferably, the visual information items 41, 42, 43 are defined in order to fulfill a foolproofing function. In the event of incorrect positioning, no visual information 41, 42, 43 is present at the reading mark 35.

As shown in FIG. 2, the gripping members 31, 32 are in the form of handles, preferably made of leather, in order to allow an operator to tension the tape 30 around the circumference conveniently and remotely, without risk of touching the still hot disk brake system 2.

Optionally, at least one gripping member 31, 32 is connected to the tape 30. In this example, the loop formed by the tape 30 cannot be removed due to the presence of the gripping members 31, 32. In this example, each gripping member 31, 32 is connected to the tape 30 via a snap hook, but other means of connection could be suitable (hook, clip, etc.). The tape 30 and the reading head 34 thus form a loop which will not be removable thanks to the gripping members 31, 2 making the measuring device 3 easier to use.

The invention also relates to a method for monitoring the disk brake system 2 of the aircraft landing gear 1 with the monitoring device 3. In this implementation, an operator wishes to check the external perimeter of a stator disk 21 located at the center of a disk brake system 2.

First, the perimeter of the loop formed by the tape 30 is adjusted to be greater than that of the stator disk 21 and pass the rotor disks 2. Due to its small width, the tape 30 may be slid between two rotor disks 22 without the risk of the operator being in contact with the heat of the disk brake system 2. The method comprises a step of positioning the tape 30 in contact with the circumference of the stator disk 21, in particular, between two rotor disks 22.

The method comprises a step of traction by an operator on the first gripping member 31 and on the second gripping member 32 so as to tension the tape 30 around the circumference of the stator disk 21. During this step of traction, the perimeter of the loop formed by the tape 30 is reduced. The tape 30 slides into the slots 33, 34 to adapt the perimeter of the loop. Depending on the perimeter of the stator disk 21, the visual information 41, 42, 43 positioned opposite the reading mark 35 is different. Due to its thin thickness, the tape 30 precisely conforms to the external shape of the stator disk 21 and the circumference measurement is accurate.

The method comprises a step of reading a relative visual information item 41, 42, 43 around the circumference of the stator disk 21 on the tape 30 so as to deduce therefrom the degradation of the stator disk 21 by thermal oxidation.

In this example, in the presence of low degradation (first visual information 41), no maintenance step is implemented. In case of severe degradation (second visual information 42), increased monitoring is planned. In case of critical degradation (third visual information 43), a maintenance operation is performed.

Advantageously, due to the low coefficient of thermal expansion of the tape 30, the measurement of the outer circumference is only slightly affected by the temperature of the stator disk 21. The presence of a visual information item 41, 42, 43 in the form of a color associated with a circumferential range advantageously allows monitoring under difficult conditions (rain, snow, night, etc.) in a rigorous manner.

Advantageously, the gripping members 31, 32 allow a gap to release the measuring device 3 of the disk brake system 2 and pass the rotor disks 22. The operator may enlarge the diameter of the loop by applying small jerks to the gripping handles 31, 32 in order to be able to disengage the measuring device 3 from its measuring position.

The invention claimed is:

1. An assembly of a disk brake system of an aircraft landing gear and a monitoring device, the disk brake system comprising at least one stator disk and at least one rotor disk configured to be pressed against said stator disk, the monitoring device comprising:
   a tape extending longitudinally, the tape comprising at least one visual information item associated with a predetermined circumferential range of the stator disk, the tape being positioned in contact with the circumference of the stator disk,
   a first gripping member attached to a first end of the tape and
   a second gripping device attached to a second end of the tape to tension the tape around the circumference of the stator disk to precisely determine the circumference of the stator disk.

2. An assembly according to claim 1, wherein the tape is made of a material having a coefficient of thermal expansion less than $15*10^{-6}K^{-1}$.

3. An assembly according to one of claim 1, wherein the tape has a width of less than 10 mm.

4. An assembly according to claim 1, wherein at least one visual formation item is in the form of a longitudinal portion of the tape that comprises a color and/or a relief.

5. An assembly according to claim 1, wherein the tape has at least two visual information items associated respectively with two predetermined circumferential ranges of the stator disk.

6. An assembly according to claim 1, wherein the tape has at least one slot wherein a portion of the tape is inserted so as to form a loop configured to be positioned in contact with the circumference of the stator disk.

7. An assembly according to claim 1, wherein the tape has at least one reading mark configured to determine the visual information to be taken into account.

8. An assembly according to claim 1, wherein the tape is metallic.

9. An assembly according to claim 1, wherein the stator disk is mounted between two rotor disks, the thickness of the stator disk being less than 10 mm.

10. A method for checking a disk brake system of an aircraft landing gear with a monitoring device according to an assembly according to claim 1, the disk brake system comprising at least one stator disk and at least one rotor disk configured to be pressed against said stator disk, the monitoring method comprising:
    A step of positioning the tape in contact with the circumference of the stator disk,
    A step of traction by an operator on the first gripping member and on the second gripping member so as to tension the tape around the circumference of the stator disk, and
    A step of reading a visual information item relative to the circumference of the stator disk on the tape in order to deduce therefrom the degradation of the stator disk by thermal oxidation.

\* \* \* \* \*